United States Patent [19]

Yagishita

[11] 3,935,107

[45] Jan. 27, 1976

[54] FILTER

[76] Inventor: Aisaburo Yagishita, No. 5-2, Shinho-cho 4-chome, Chigusa, Nagoya, Aichi, Japan

[22] Filed: Dec. 18, 1973

[21] Appl. No.: 425,829

[52] U.S. Cl. ............... 210/243; 210/332; 210/344; 210/347; 210/415
[51] Int. Cl.² ............... B01D 23/00; B01D 23/24; B01D 29/00
[58] Field of Search ........... 210/332, 342, 344, 415, 210/243

[56] References Cited
UNITED STATES PATENTS

| | | | |
|---|---|---|---|
| 1,229,839 | 6/1917 | Wedge | 210/415 X |
| 3,240,344 | 3/1966 | Hoelscher | 210/344 X |
| 3,252,885 | 5/1966 | Griswold | 210/243 X |
| 3,297,163 | 1/1967 | Landon | 210/332 X |
| 3,356,219 | 12/1967 | Möller | 210/332 X |
| 3,513,090 | 5/1970 | Migule et al. | 210/332 X |
| 2,946,447 | 7/1960 | Welz | 210/347 X |

*Primary Examiner*—Frank A. Spear, Jr.
*Assistant Examiner*—Ferris H. Lander
*Attorney, Agent, or Firm*—Armstrong, Nikaido & Wegner

[57] ABSTRACT

A filter characterized in that a plurality of screen plates each having a penetration hole at its central portion are disposed inside of a filter box in a stacked form with a distance between each other in such a manner that the penetration holes are aligned up-and down-wards. The raw liquid to be filtered is fed through said penetration holes and the filtrate is collected at plurality of portions disposed at a nearly equal intervals in the peripheral part of said screen plates.

7 Claims, 4 Drawing Figures

FILTER

BACKGROUND OF THE INVENTION

The present invention relates to a filtering apparatus in which the filter bed can be formed uniformly over the screen plate and thereby a uniform filtration can be effected.

In a filter provided with a screen plate as a filter medium it is usual to collect the filtrate through a supporting member which supports part of the screen plate. In this case, however, if the filtering surface is uniform, the filterate which has passed through an area of the filtering surface in the neighborhood of the collector such as the screen plate supporting member would have been encountered by a smaller internal resistance than that passed through the areas far off the collector. This means that the amount of filtration load is greater at area nearer to the collector than those distant therefrom.

In order to achieve an effective filtration, it is desirable to give a uniform filtering ability over the whole filtering surface. For this purpose, it is to provide a uniform filter bed.

During the precoating a filter aid onto the filter medium by circulating it, there is tendency towards nonuniform formation of the filter bed, because the amount of the precoat liquor containing the filter acid passing through per unit of time is greater in the neighborhood of the collector than that far therefrom, resulting in a greater amount of filter aid being precoated there.

Generally, in prior art filters with a screen plate, the screen plate is supported at the central portion and the filtrate passing through said screen plate is collected using the supporting member. With this construction, however, the unequality between the filtration at the inner portion and that at the outer side portion of the screen plate as mentioned above will be significant, since the collector is only singly provided and, in addition, the collector portion is located far apart from the surrounding large area for the filtration.

SUMMARY OF THE INVENTION

In order to eliminate such drawbacks, the present invention has been made. An object of the present invention is to provide a filter capable of attaining mechanically an effective filtration, in which a feed portion for the original liquor to be filtered is arranged at the central part of the screen plate, and a plurality of collector portions for the filtrate are arranged at nearly equal interval at the circumferential part of the screen plate, thereby to avoid the above-mentioned inequality.

Another object of the present invention is to provide a filter having a conical screen plate, in which the both advantages intrinsic of a filter having vertical filter surface and of that having horizontal filter surface are effectively combined.

In a pressure filter having vertical filtration surface, the filtration is unstable, since the cake formed on the filter surface, when a large amount of filtrate accumulates because it slides down by its own gravity upon pressure change. On the other hand, it is noted that a flush removal of the cake may cause clogging.

By contrast, in filters having horizontal filtration surface, the disadvantages are reversed.

According to the present invention, there is provided a new filter with conical screens suitable for achieving the uniform and steady formation of the filter bed just as in a horizontal screen plate and a complete removal of the cake using a small amount of flush water just as in a vertical screen plate, without any decrease in the filtering ability. Such filter is so constructed that the mounting of filter cloth onto the conical screen plate is carried out firmly and the stacked assemblage thereof is done firmly.

A further object of the present invention is to provide a filter which is so constructed that the water flush cleaning is carried out using a rotary jet shower pipe provided with many nozzles displaced in the circumferential direction for jetting the flush water onto each of the stacked conical screen plates, so that the discharge of the cake is not disturbed by an eventual local accumulation of the cake within the filter box.

A still further object of the present invention is to provide a filter in which jetting of the water flush cleaning is carried out successively upon the conical stacked screen plates one after another using a rotary jet shower pipe capable of a vertical movement, whereby the occurrence of clogging by accumulation of a large amount of the cake at the discharge opening can be avoided.

A still further object of the present invention is to provide a filter in which the filter box is coupled with the filter aid mixing vessel and an agitation blade is provided inside the mixing vessel at a portion corresponding to the above-mentioned rotary jet shower pipe, thereby to effect co-utilization of the motive power and, at the same time, to enable a construction of the whole assemblies of the filter to be compact.

A still further object of the present invention is to provide a filter in which the conical screen plates are stacked in a form upside-down and a feed portion for feeding the liquor to be filtered is located at central portion of the screen plate. The filtrate is collected at the peripheral portion of the screen plate, such that the rotating jet shower pipes moving along the circumference of the screen plate are disposed so as to enable the cake to be discharged out from said feed portion.

A further object of the present invention is to provide a filter with conical screen plates which is so constructed that, in order to capture a metallic ingredient in the liquor to be treated, the conical screen plates are electrode plates and are each coupled with a conical counter electrode plate stacked on each another. So as each electric junction member of respective electrode plates can be connected to the respective plus or minus electrode pole in a manner allowing easy assembly and disassembly.

DESCRIPTION OF THE PREFERRED EMBODIMENT

Figure 1:
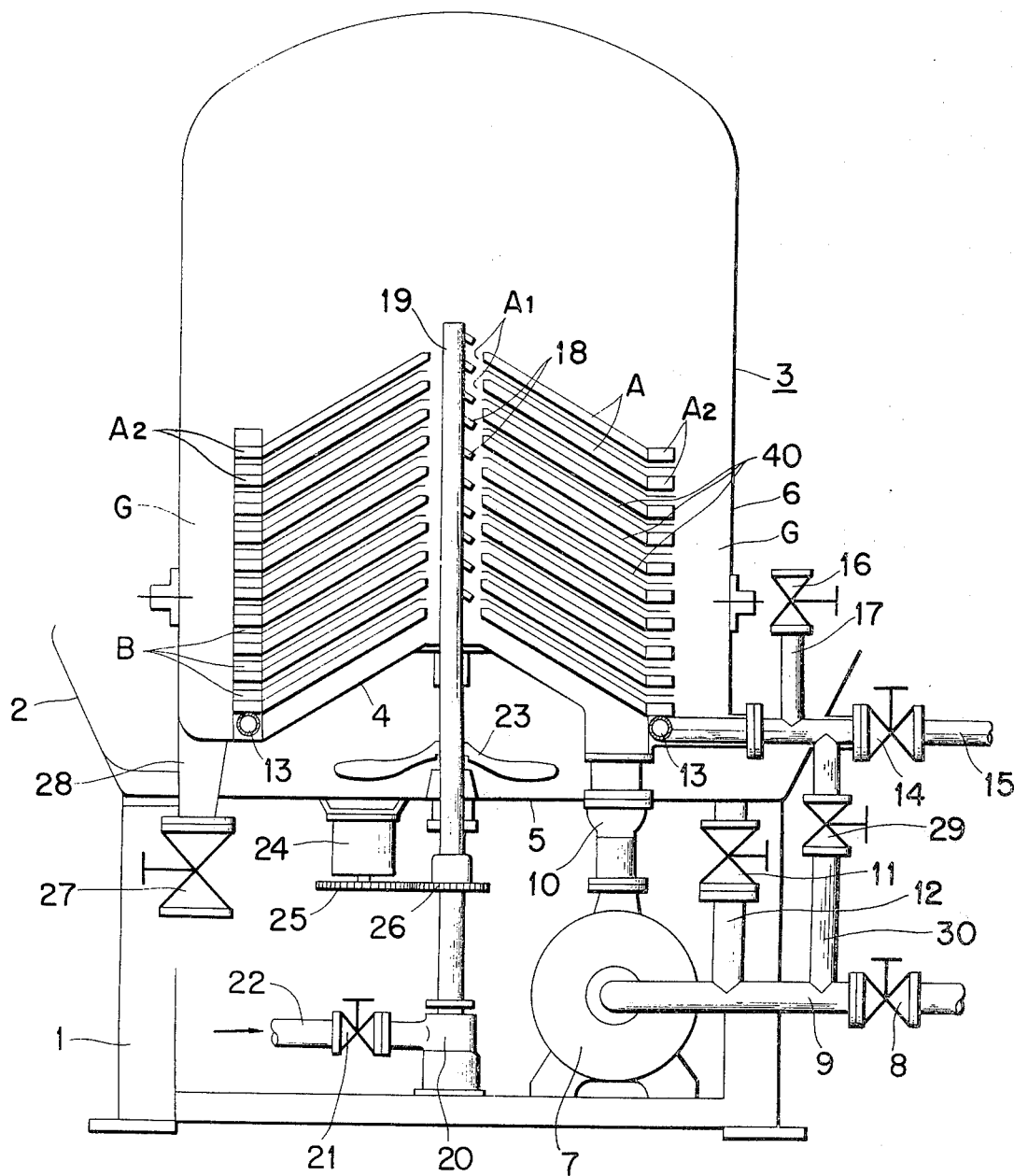
FIG. 1 shows a vertical sectional view of an exemprary filter having conical screen plates according to the present invention.
Figure 2:
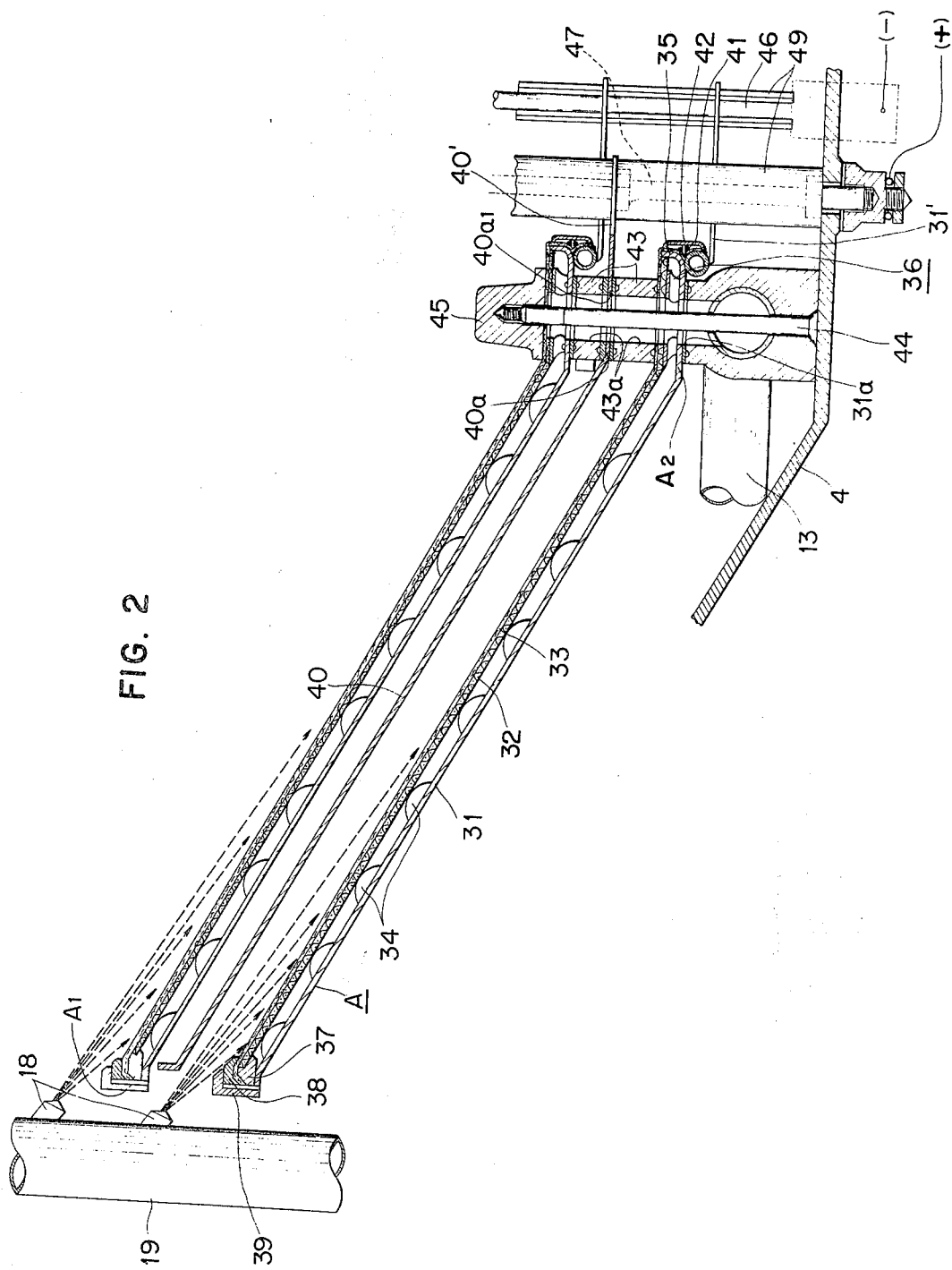
FIG. 2 is a vertical sectional view showing the conical screen plate and the conical electrode plate.
Figure 3:
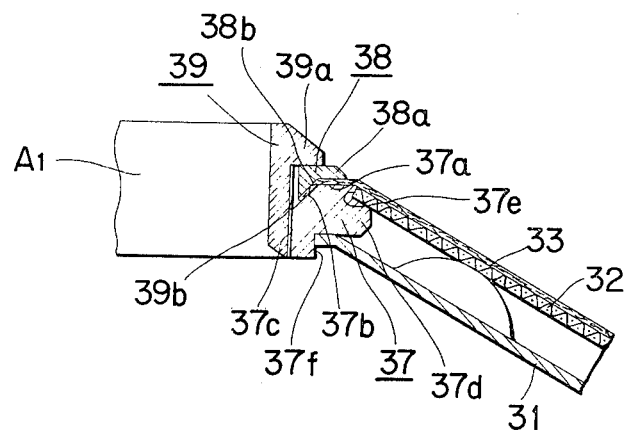
FIG. 3 is an enlarged partial sectional view showing the construction of the inner circumferential edge of the conical screen plate.
Figure 4:
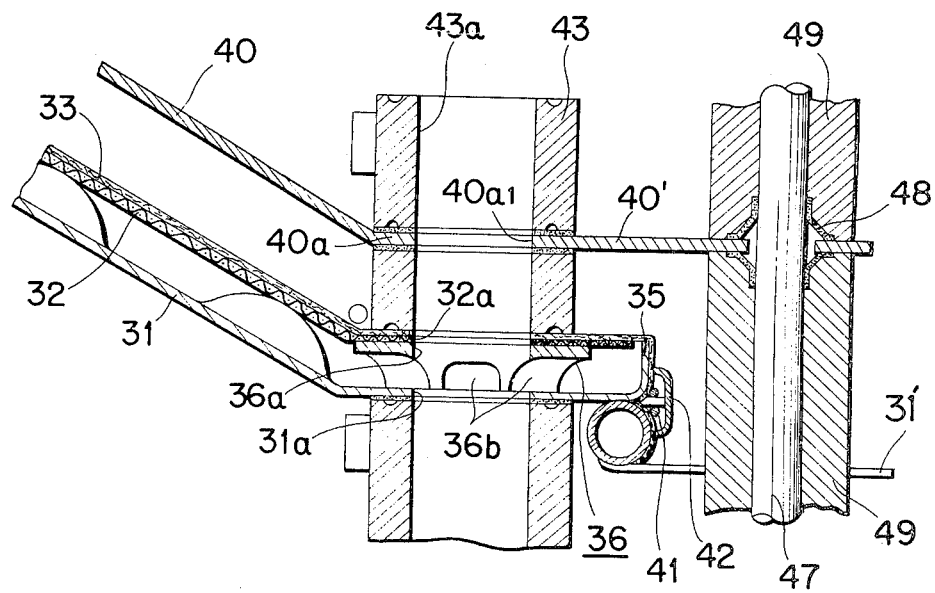
FIG. 4 is an enlarged section showing the construction of the outer circumferential edge of said conical screen plate.

The invention is further explained with reference to an example of the present invention by the attached drawings. In the drawings, 1 is the base frame, upon which a filter aid mixing vessel 2 is located. Inside the mixing vessel 2 is arranged a filter box 3 standing upwards therefrom. The bottom plate 4 of the filter box 3 is disposed at a distance from the bottom plate 5 of the mixing vessel 2, so that the liquid in the mixing vessel 2 fills up the space defined by the bottom plate 4 and by the shell wall 6 of the box 3. The bottom plate 4 is constructed in a conical shape.

Inside of the frame 1 is arranged a liquid feed pump 7. To the feed pump 7 are connected a suction pipe 9 and a raw liquid feed pipe 10 which passes through the mixing vessel 2 and opens into the filter box at the bottom plate 4. A connection pipe 12 with a valve 11 is disposed between the bottom plate 5 of the mixing vessel 2 and the suction pipe 9.

Within the filter box, conical screen plates A, each having at the top a cutted-off penetration hole $A_1$, are stacked on each other separated by an adequate distance in vertical direction in such a manner that the penetration holes $A_1$ are aligned in vertical direction. The plates are fixed, with their tops being selfsustained freely, by the base portion thereof onto the supporting members B arranged at the peripheral portion $A_2$ at a selected interval, so as to form an annular space G between the peripheral portion $A_2$ and the shell wall 6 of the filter box 3.

The supporting member B is used at the same time as the collector member for the filtrate. Underneath the supporting member B is arranged a filtrate collecting pipe 13 which forms a seal between the peripheral portion $A_2$ of the lowermost conical screen plate A and the filter box bottom plate 4 affording communication of the plurality of supporting members B. To the collector pipe 13 is connected a filtrate discharge pipe 15 with a valve 14. The pipe 15 passes through the mixing vessel 2 and the shell wall 6 of the filter box 3. A filtrate draw-out pipe 17 with a valve 16 is provided on the discharge pipe 15 for the inspection of the filtrate.

Inside the vertically aligned penetration holes $A_1$ of the conical screen plates A, a rotary jet shower pipe 19 having jet nozzles 18 is provided. The lower part of said pipe 19 penetrates through the bottom plates 4 and 5 to communicate with the flushing water feed pipe 22 having a valve 21 through a joint member 20. The rotary jet shower pipe 19 has an agitation blade 23 located within the mixing vessel 2 and is rotated by a motor 24 disposed inside of the base frame 1 through gears 25 and 26.

Beneath the annular space G, at the circumferential portion of the filter box bottom plate 4 there is provided drain outlet 28 having a valve 27.

Between the suction pipe 9 and the filtrate discharge pipe 15, a circulation pipe 30 with a valve 29 is interposed.

In operating the filter constructed as above, the liquid in the mixing vessel 2 containing the filter aid is first circulated by starting the feed pump 7 with the valves 11 and 29 being kept open and the valves 8 and 14 being kept closed. The liquid passes through the connection pipe 12, raw liquid feed pipe 10, penetration holes $A_1$, conical screen plates A, supporting member B, collector pipe 13, filtrate discharge pipe 15 and circulation pipe 30, to thereby build up a precoat over the filter cloths on the conical screen plates. Then, the raw liquid to be filtered is conducted from the suction pipe 9 by opening the valves 8 and 14 and closing the valves 11 and 29, so that the liquid is passed through the so coated conical screen plates so as to be subjected to filtration. The filtrate obtained is discharged from the filtrate discharge pipe 15. During the operation of precoat, the precoating liquid mixed with the filter aid is agitated by rotating the agitation blade 23 through the rotary jet shower pipe 19.

After a filter cake has been heaped over the conical screen plate, the cake is flushed off by jetting the flush water from the nozzles 18, while rotating the rotary jet shower pipe 19 by the motor 24 and feeding the flushing water to the shower pipe 19. The muddy water obtained is drained off from the drain outlet 28 by opening the valve 27.

It is possible to arrange the jet nozzles on the rotary jet shower pipe 19 directed for each of the stacked conical screen plates in such a manner that they are distributed around the shower pipe 19 displacedly from each other, so as to distribute the flow down of the accumulated cake into the annular space G upon water flushing, in order to avoid the difficulty of the drain off caused from the local piling of cake in the annular space. It is also possible to employ a rotary partial jet shower pipe which has jet nozzles and which is movable in vertical direction, so as to jet the flush water successively onto each of the stacked conical screen plates, in order to avoid the above-mentioned difficulty due to the local collapse of the cake.

Moreover, the conical screen plate A is composed of a main plate 31, a raster screen 32 and a filter cloth 33. Over the whole surface of the main plate 31, many projections 34 are formed at an adequate interval by press work. At the circumferential edge of the main plate is provided a flange 35.

The peripheral portion $A_2$ of the conical screen plate A is formed into a flat skirt, and a spacer 36 having passage holes 36b in radial direction and passage ways 36a up-and down-wards is interposed between the main plate 31 and the raster screen 32 and fixed therein by welding. The passage ways 36a coincide with the perforation 31a of the main plate 31 as well as with the perforation 32a of the raster screen 32 to communicate therewith.

At the portion of the penetration hole of the conical screen plate, i.e., at the inner peripheral edge, the main plate 31 and the raster screen 32 are welded onto a spacer ring 37. The spacer ring 37 is constructed in such a manner that it has a flat upper surface 37a followed by a tapered surface 37b and continues to an inner screwed surface 37c and, on its outer surface, there are two butting stages 37e and 37f, which are disposed above and below the distance-holding portion 37d. The raster screen 32 and the main plate 21 are welded to the portion 37d. 38 is a washer ring which has on its rear side a flat portion 38a corresponding to the flat surface 37a of the spacer ring 37 and a tapered portion 38b corresponding to the tapered surface 37b of the spacer ring. 39 is a tightening ring having a press jaw 39a and a screw portion 39b around the outer surface.

40 denotes a conical electrode plate having at its outer peripheral portion a flat skirt 40a, with a perforation $40a_1$.

On the upper surface of the conical electrode plate 40a, a plastic insulation coating is applied.

In order to assemble the conical screen plates A, the filter cloth is first put on the plate A, and then, the washer ring 38 is mounted at the inner edge, and thereafter, by screw fixing the tightening ring 39 onto the spacer ring 37, the inner edge of the filter cloth 33 is pinched firmly, while the outer peripheral edge of the cloth is dangled along the flange 35 and is held by strings 41 and covered with an annular band 42 thereon.

The conical screen plate A so constructed and the electrode plate 40 are then stacked alternately with an interposition of a supporting and collecting pipe unit 43 having a vertical communication hole 43a and are fixed by screwing a fixing bolt 44 disposed through the communication hole 43a into a tightening cover 45.

To the main plate 31 of the conical screen plate A and to electrode plate 40 are affixed junction members 31' and 40' leading respectively to the cathodic and anodic poles 46 and 47 disposed close to the stacked assembly. Upon assembling, the junction members 31', 40' are pinched by an insulator tube unit provided with electro-conductive cores 48 at its terminal surfaces.

Further, it is also possible to construct the filter assemebly in such a manner that the bottom plate 4 of the filter box 3 is shaped in the form of a reverse crown and the conical screen plates A according to the present invention are assembled by stacking them in the upside-down direction, while the jet shower pipe 19 is arranged movably around the circumference of the conical screen plate. By disposing the drain outlet 28 at the central portion of the box the cake is drained off from the central raw liquid feed $A_1$ by adequately opening and closing the valves.

It should further be noted that the conical screen plate according to the present invention can be modified without departing from the scope and gist of the present invention into, for example, a form of polygonal cone may be used, since the technical idea does not change thereby.

What is claimed is:

1. A filter comprising a plurality of screen plates, each having a penetration hole at its central portion, said plates being disposed inside of a filter box in a stacked form with a predetermined distance between each said plate such that the penetration holes are vertically aligned, pump means for pumping a raw liquid from an input pipe connected thereto through said penetration holes, wherein the raw liquid to be filtered is fed through said penetration holes onto the central portion of each of said screen plates and flows towards the peripheral portion thereof such that the filtrate is collected at a plurality of portions disposed at nearly equal intervals on the peripheral portion of each of said screen plates, a rotary jet shower pipe positioned within said penetration holes such that said jet shower pipe does not contact the edges of said penetration holes, and collector means operatively coupled to said peripheral portion of said screen plate for collecting and removing the filtrate collected on said peripheral portions of said screen plates.

2. A filter according to claim 1, wherein the screen plates are conical screen plates.

3. The filter according to claim 2, wherein the conical screen plate comprises a filter cloth fixed at the inner peripheral edge by a tightening and washer ring and fixed to its outer peripheral edge by an annular tightening member wherein a supporting and collecting pipe is positioned on the peripheral portion of the screen plates.

4. A filter according to claim 1 wherein said rotary jet shower pipe has nozzles for jetting flush water onto each of the stacked conical screen plates, and wherein the nozzles are displaced around the shower pipe, and are disposed inside the penetration holes.

5. A filter according to claim 3, further including an agitation blade connected to a portion of the pipe within the filter box.

6. A filter according to claim 1, wherein said rotary jet shower pipe is arranged movably in the vertical direction inside the penetration holes.

7. A filter according to claim 1, further including electrode plates wherein junction members are affixed to the screen plates and to the electrode plates, the electrode plates being connected respectively to the anodic and cathodic conduction poles, each arranged in a standing position being held by insulator units having electro-conductive cores at the terminal surface thereof.

* * * * *